(12) United States Patent
Mcginty et al.

(10) Patent No.: US 10,218,264 B1
(45) Date of Patent: Feb. 26, 2019

(54) METHOD OF ELIMINATING POWER CONVERTER INPUT POWER VARIATIONS AND MINIMIZING ENERGY STORAGE CAPACITOR REQUIREMENTS FOR A PULSED LOAD SYSTEM

(71) Applicant: Raytheon Company, Waltham, MA (US)

(72) Inventors: John Mcginty, Hudson, MA (US); Stephen R. Reid, Ayer, MA (US); Alan Cuerden, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 281 days.

(21) Appl. No.: 14/243,622

(22) Filed: Apr. 2, 2014

(51) Int. Cl.
*H02M 3/04* (2006.01)

(52) U.S. Cl.
CPC ..................... *H02M 3/04* (2013.01)

(58) Field of Classification Search
CPC ............ H02M 3/04; H02M 3/16; H02M 3/18; H02M 1/082; H02M 1/14; H02M 1/15
See application file for complete search history.

(56) References Cited

U.S. PATENT DOCUMENTS

| | | | | |
|---|---|---|---|---|
| 6,137,267 A * | 10/2000 | Kates | ..................... | H02J 7/0052 320/135 |
| 6,518,738 B1 * | 2/2003 | Wang | ..................... | H02M 3/156 323/272 |
| 7,276,861 B1 * | 10/2007 | Shteynberg | ........... | H02M 3/157 315/224 |
| 2002/0135345 A1 * | 9/2002 | Terashi | .................. | H02M 3/156 323/283 |
| 2005/0057238 A1 * | 3/2005 | Yoshida | ................ | H02M 3/156 323/282 |
| 2005/0110474 A1 * | 5/2005 | Ortiz | ....................... | H02M 1/14 323/282 |
| 2008/0007235 A1 * | 1/2008 | Hane | ...................... | H02M 3/158 323/282 |
| 2009/0261799 A1 * | 10/2009 | Illipe | ........................ | G05F 1/46 323/293 |
| 2011/0085576 A1 * | 4/2011 | Crawford | ........... | H05B 33/0818 372/38.07 |
| 2011/0292699 A1 * | 12/2011 | Goerke | ................... | H02M 1/15 363/84 |
| 2012/0265195 A1 * | 10/2012 | Gilbert | ............... | H03H 17/0027 606/34 |
| 2013/0147444 A1 * | 6/2013 | Temkin | ............. | H02M 3/33523 323/234 |

(Continued)

*Primary Examiner* — Adolf Berhane
*Assistant Examiner* — Bart Iliya

(57) ABSTRACT

A power system having a controller coupled to a power converter and configured to sense a pulsed load current and a load voltage, and configured to control the power converter such that the power converter draws a constant power from a power source to avoid disturbances in the power source while delivering the pulsed load current. The controller is configured to determine an average value of the pulsed load current and an average value of the load voltage to determine an average power delivered to the load. The controller is configured to dynamically establish the charge current to a capacitor bank as a function of the sensed instantaneous load voltage such that the power converter draws a constant power from the power source.

20 Claims, 4 Drawing Sheets

(56) References Cited

U.S. PATENT DOCUMENTS

2014/0191736 A1* 7/2014 Babazadeh ......... H02M 3/1582
                                            323/271
2014/0203633 A1* 7/2014 Nishi ................. H02J 7/00
                                            307/10.1

* cited by examiner

METHOD OF ELIMINATING POWER CONVERTER INPUT POWER VARIATIONS AND MINIMIZING ENERGY STORAGE CAPACITOR REQUIREMENTS FOR A PULSED LOAD SYSTEM

TECHNICAL FIELD

The present disclosure is directed in general to power systems and power conversion, and more specifically to power systems providing a large pulsed current to a load.

BACKGROUND OF THE DISCLOSURE

Power systems with pulsed loads e.g. large radars typically have a large pulsed load during a radar transmit period, followed by a smaller load during a radar receive period. If the power system has limited energy storage, the system input power profile will follow the pulsed load. Drawing pulsed power from a utility or a generator causes voltage disturbances which can disturb other equipment on the same power distribution bus. The pulsed load can also cause damaging vibrations in the generator and heating of the windings due to the higher rms current of the pulsed input power.

The traditional solution for a pulsed power system is to have a large capacitor bank which provides the peak power to the load during the pulse, and the capacitor bank energy is replenished by charging with a constant current at the mathematical average value of the load current. The power variation at the system input is the product of the charge current and capacitor bank voltage. Even with a constant DC charge current to the system input, the system input power will vary in proportion to the voltage of the capacitor bank, therefore, a <1% voltage droop at the capacitor bank would be required to meet<1% input power variation. The traditional method regulates output voltage to an average constant value using a voltage loop with a time constant much greater than the pulse repetition frequency. The slow loop acts as a low pass filter such that the converter supplies a constant current to the capacitor bank, which attenuates the pulsed load current and therefore has practical limitations in the maximum attenuation.

There is desired a power system that mitigates the effects of the pulsed current load on the input power source.

SUMMARY OF THE DISCLOSURE

To address one or more of the above-deficiencies of the prior art, one embodiment described in this disclosure provides a method of eliminating power converter input power variations and minimizing energy storage capacitor requirements for a pulsed load system.

In one preferred embodiment, a power system comprises a capacitor, a power converter configured to charge the capacitor with a charge current, the power converter and the capacitor configured to deliver a pulsed load current to a load at a load voltage, and a controller coupled to the power converter and configured to sense the pulsed load current and the load voltage, and configured to control the power converter such that the power converter draws a constant power from a power source while delivering the pulsed load current to the load. The controller is configured to determine an average value of the pulsed load current and an average value of the load voltage to determine an average power delivered to the load. The controller is configured to establish the charge current as a function of the sensed instantaneous load voltage such that the power converter draws a constant power from the power source. The power converter comprises a DC/DC converter, and the capacitor comprises a capacitor bank.

In another preferred embodiment, a method of operating a power system comprises a power converter charging a capacitor with a charge current, the power converter and the capacitor delivering a pulsed load current to a load at a load voltage, and a controller sensing the pulsed load current and the load voltage, and controlling the power converter such that the power converter draws a constant power from a power source while delivering the pulsed load current to the load. The controller determines an average value of the pulsed load current and an average value of the load voltage to determine an average power delivered to the load. The controller establishes the charge current as a function of the sensed instantaneous load voltage such that the power converter draws a constant power from the power source. The power converter comprises a DC/DC converter and the capacitor comprises a capacitor bank.

In another preferred embodiment, a device comprises a controller configured to control a power converter configured to charge a capacitor with a charge current, the power converter and the capacitor configured to deliver a pulsed load current to a load at a load voltage. The controller is configured to sense the pulsed load current and the load voltage, and is configured to control the power converter such that the power converter draws a constant power from a power source while delivering the pulsed load current to the load. The controller is configured to determine an average value of the pulsed load current and an average value of the load voltage to determine an average power delivered to the load. The controller is configured to establish the charge current as a function of the sensed instantaneous load voltage such that the power converter draws a constant power from the power source. The power converter comprises a DC/DC converter.

Certain embodiments may provide various technical advantages depending on the implementation. For example, a technical advantage of some embodiments may include providing a pulsed load current to a large radar system, or other systems drawing large current pulses. Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

This disclosure includes a controller that dynamically calculates the power converter output current required to achieve constant power at the power converter input. This disclosure includes an algorithm that calculates and generates the ideal converter output current waveform required to achieve a perfectly constant input power, even with large voltage variations on the capacitor bank. The capacitor bank voltage droop during the transmit period is (Ipeak−Icharge)× Pulsewidth/Capacitance. This disclosure raises the charge current to the capacitor bank as the capacitor bank voltage droops resulting in less voltage droop at the end of the pulse for a given capacitance. This advantageously allows the use of a smaller energy storage capacitor for a specified maximum voltage droop.

Figure 1:
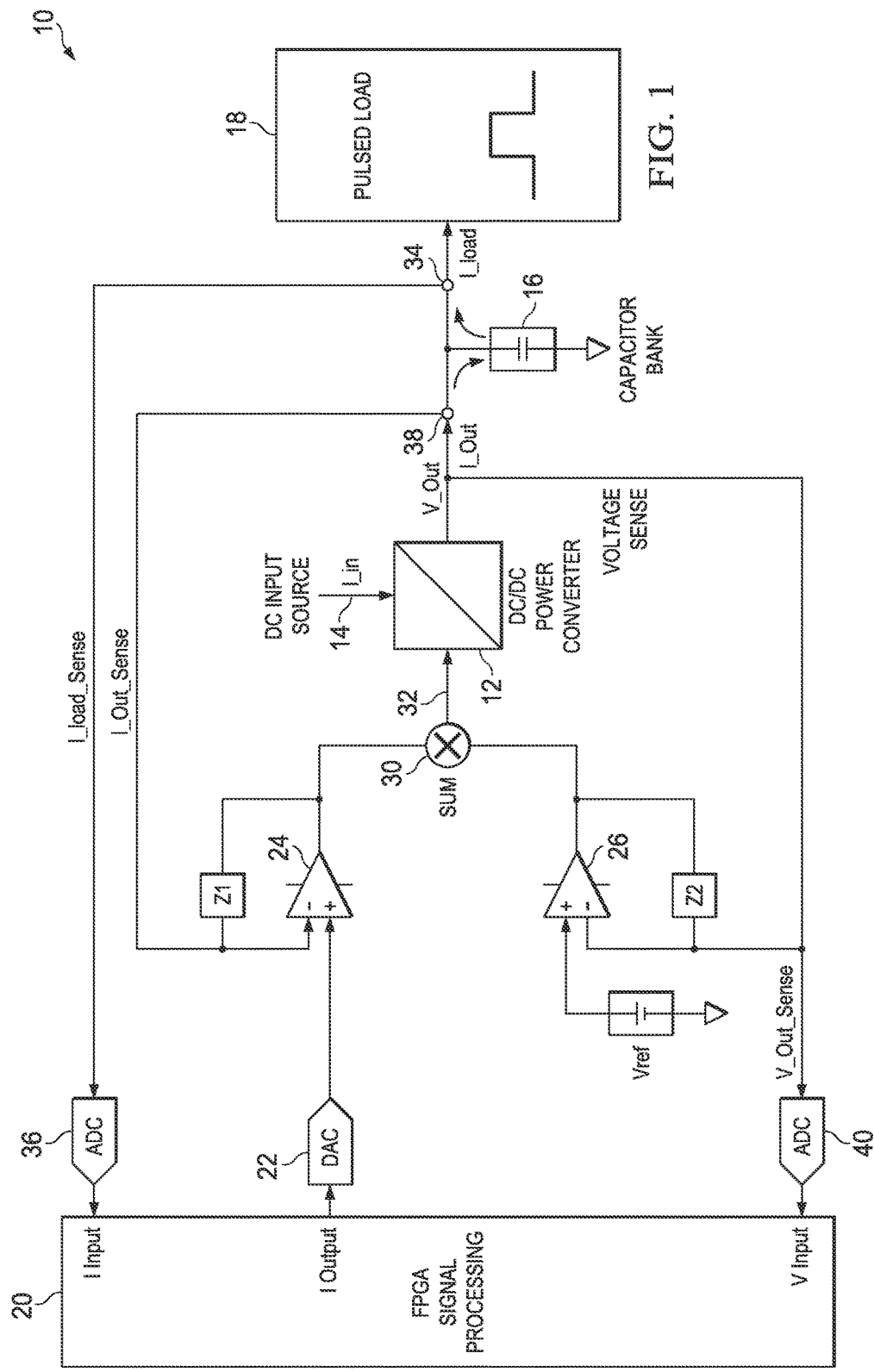
FIG. 1 illustrates a schematic diagram of a power system configured to draw a constant power while delivering a pulsed load current to a load.

Referring to FIG. 1, there is shown a power system 10 seen to include a DC/DC power converter 12 having a power input 14, and a capacitor bank 16 configured to deliver power to a load 18. The capacitor bank 16 may comprise of one or more capacitors. The delivered power comprises a pulsed current and load 18 may comprise a radar system configured to draw a large current during a transmit period, and a smaller current during a receive period. Load 18 may comprise of any type of load which may draw a pulsed current and limitation to a radar system is not to be inferred. Power system 10 is seen to include controller 20, which may comprise a field programmable gate array (FPGA) although other types of controllers may be used, including a single chip processor such as a digital signal processor (DSP) or multiple discrete logic or analog components. The controller 20 is configured to dynamically control the DC/DC power converter 12 via an interface comprising a digital/analog converter 22 and a pair of amplifiers 24 and 26. Amplifier 24 is configured as a current error amplifier and has a feedback component Z1 coupled to the inverting input thereof, such as a resistor and capacitor network, and amplifier 26 is configured as a voltage error amplifier having a feedback component Z2 coupled to an inverting input thereof, such as a resistor and capacitor network. A voltage reference Vref is provided to the non-inverting input of amplifier 26. The outputs of amplifier 24 and amplifier 26 are summed at node 30 and provide an analog control input 32 to the pulse width modulated (PWM) controller within the DC/DC power converter 12. A load current analog sensor 34 senses the load current provided to load 18 and provides a signal indicative of the load current to controller 20 via analog/digital (A/D) converter 36. A load voltage analog sensor 38 senses the load voltage provided to load 18 and provides a signal indicative of the load voltage to controller 20 via A/D converter 40. Power converter 12 is configured to dynamically generate a charging current signal and deliver it to the capacitor bank 16 as a function of the PWM control signal such that input power provided to DC/DC power converter 12 at input 14 is constant.

The FPGA comprising controller 20 has an algorithm which calculates the mathematical average value of the pulsed load current by integrating current samples obtained from current sensor 34 via A/D 36. The algorithm also calculates the mathematical average value of the capacitor bank voltage via voltage sensor 38. The product of the average value of charge current and average value of capacitor bank voltage is the average power required by the load 18. Since power (P)=current(I)×voltage(V) then I=P/V, therefore dividing the average value of power by the instantaneous voltage of the capacitor bank 16 yields the instantaneous capacitor bank charge current required to achieve the constant power. The FPGA samples the sensor data continuously and dynamically computes the instantaneous capacitor bank charge current required to achieve constant input power of DC/DC power converter 12.

The FPGA provides the calculated digital current value of the capacitor bank charge current to D/A converter 22 and the analog output value from D/A converter 22 is used as a current reference for a current control loop. The current error amplifier 24 ensures the DC/DC converter 12 output charge current follows the calculated current from the FPGA. The current loop frequency response is determined by feedback impedance $Z_1$. The current error amplifier 24 has a wide bandwidth to ensure that the DC/DC converter 22 follows the FPGA commanded charge current with good fidelity. In a perfect world the capacitor bank average voltage would stay at the average value when charged with the calculated charge current. In practice, the capacitor bank voltage will drift up or down if there is any error due in current sensing of the load. Voltage error amplifier 26 provides output voltage $V_{err}$ that is summed by summer 30 with the current error signal $I_{err}$ provided by current error amplifier 24 to correct for this drift. The voltage control loop frequency response is determined by feedback impedance $Z_2$. The frequency response and gain is low to prevent the voltage loop from strongly influencing the capacitor charge current, and this loop is only to achieve long term charge balance of the load current and charge current. The average value of the capacitor bank voltage is set by the fixed voltage reference Vref provided to the non-inverting input of amplifier 26.

An additional benefit of this approach over constant current charging is that the charge current increases as the capacitor voltage droops which means the voltage droop will be less.

Figure 2:
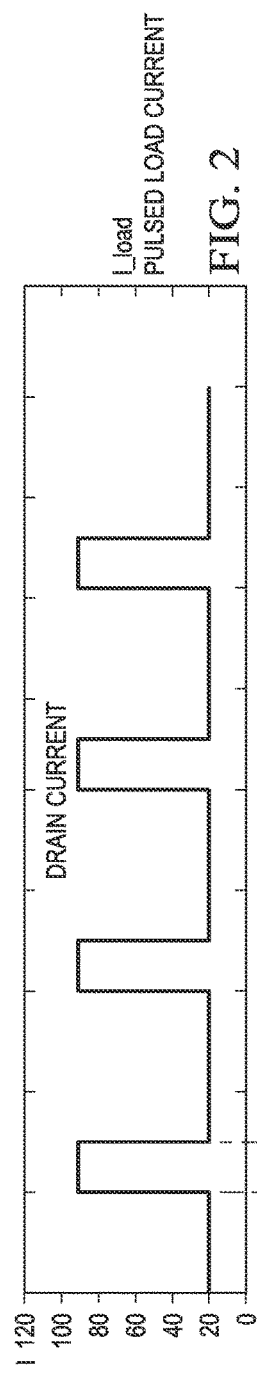
FIG. 2 is a waveform diagram of a pulsed load current delivered to the load.
Figure 3:
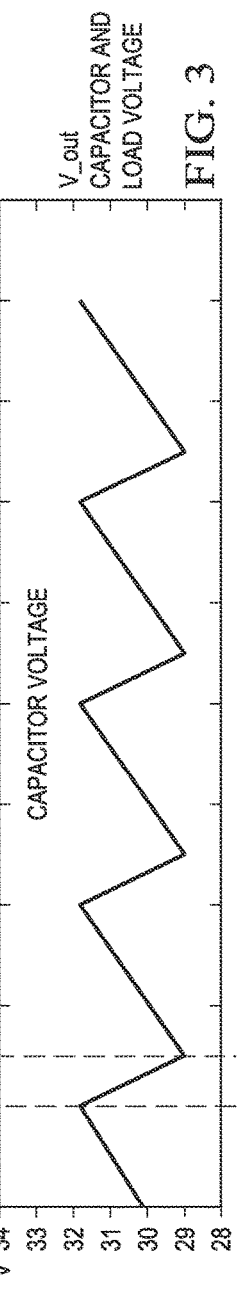
FIG. 3 is a waveform diagram of the capacitor bank voltage as a function of the pulsed load current.
Figure 4:
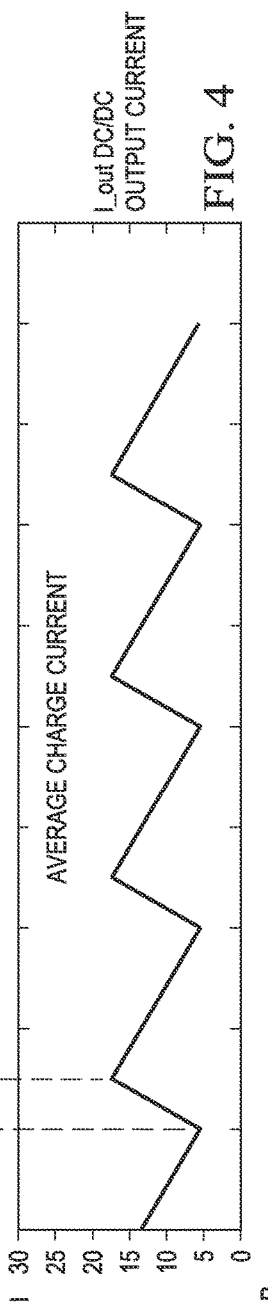
FIG. 4 is a waveform diagram of the charging current delivered to the capacitor bank as a function of the pulsed load current.
Figure 5:
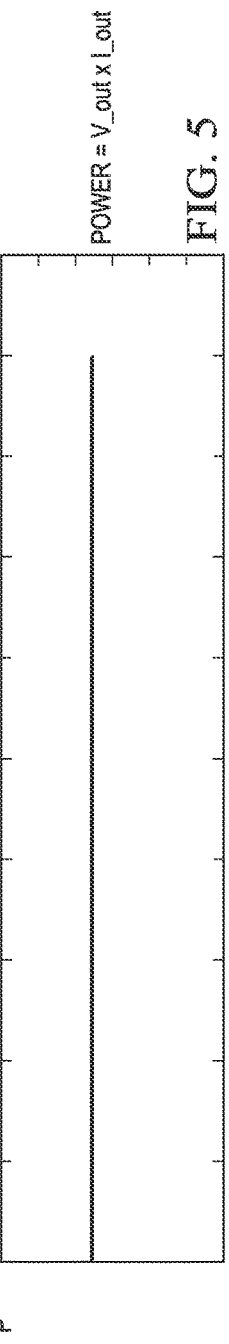
FIG. 5 is a waveform diagram of the product of V_out× L_out.
Figure 6:
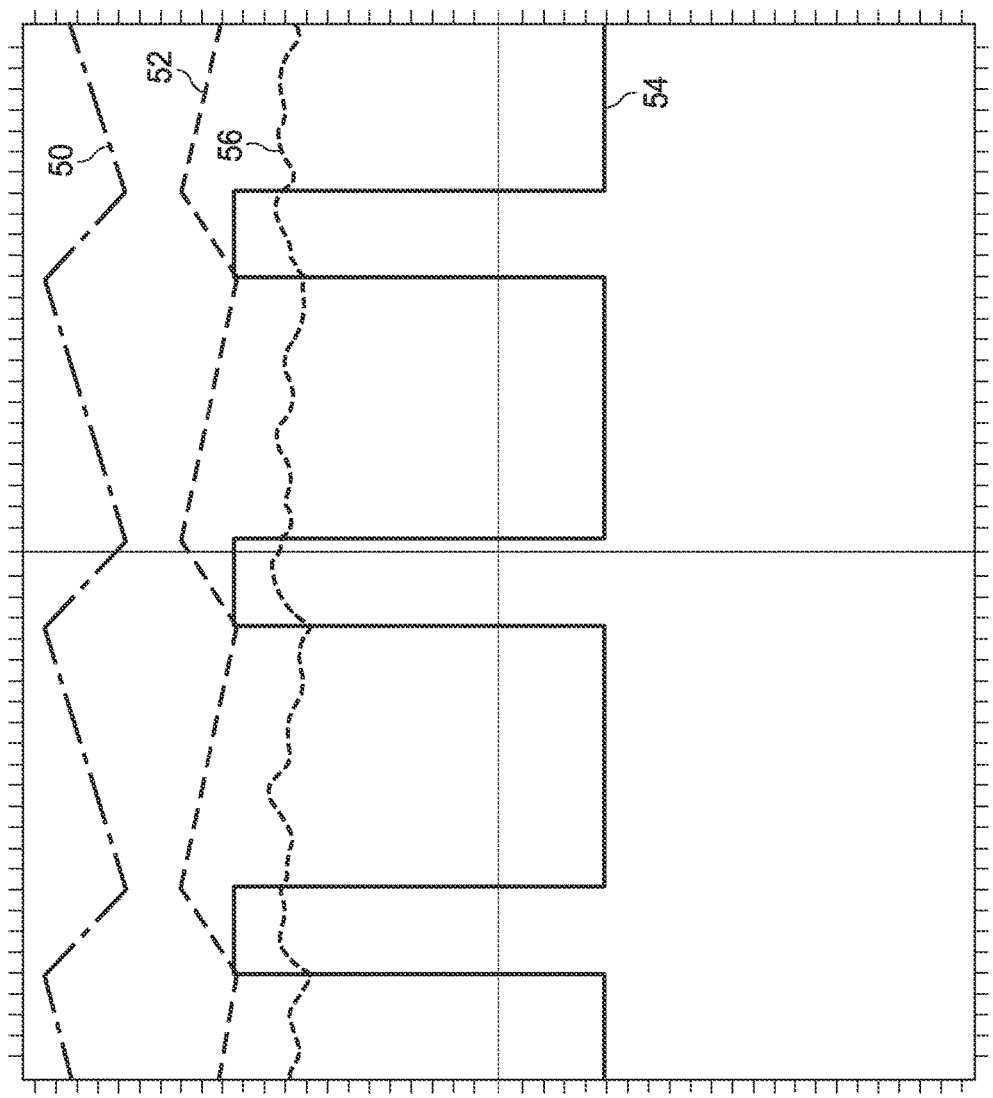
FIG. 6 is a diagram of multiple test data waveforms including a waveform of the constant input current provided to the DC/DC converter.

Simulation results are shown in FIG. 2, which shows the pulse current load profile. The capacitor bank voltage drooping during the on time and recharging during the off time is shown in FIG. 3. The charge current required to achieve constant input power to DC/DC converter 12 is shown as the DC/DC output current in FIG. 4. The capacitor bank charge current increases as the capacitor bank voltage droops such that the product of I×V=constant, as shown in FIG. 5, Test results of system 10 are shown in FIG. 6. The voltage output of the capacitor bank 16 is shown at 50, and the charge current delivered to the capacitor bank 16 by DC/DC converter 12 is shown at 52 as a function of the pulsed load current shown at 54. Advantageously, the DC input current of DC/DC converter 12 at input 14 is shown as relatively constant at 56.

Figure 7:
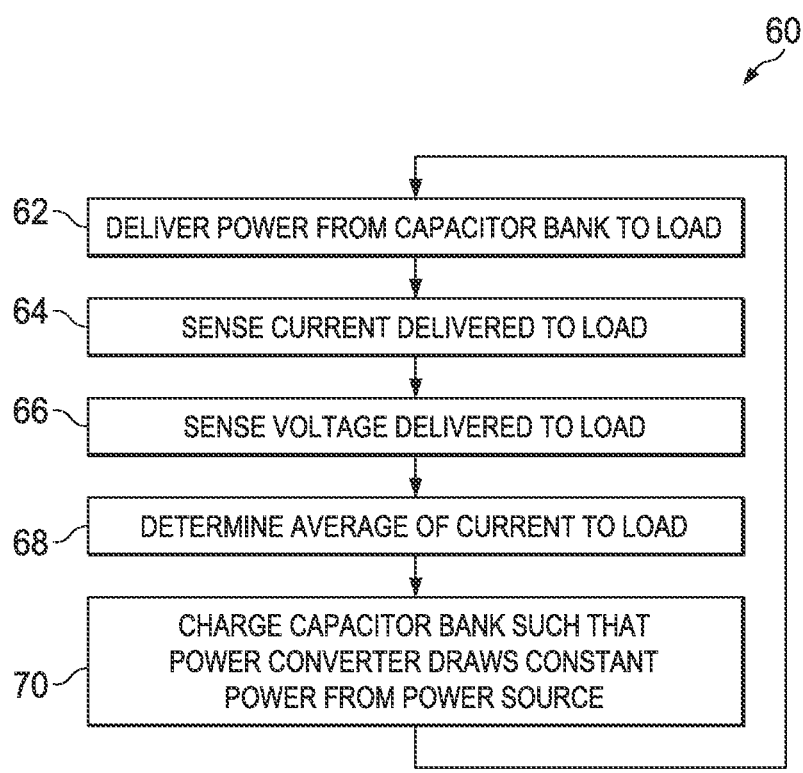
FIG. 7 is a diagram of a method of the disclosure.

Referring now to FIG. 7, there is shown at 60 a method of the controller 20 algorithm such that the power converter 12 draws a constant DC power while delivering a pulsed load current to the load 18 such as shown at 54 in FIG. 6. At step 62, the DC/DC power converter 12 and capacitor bank 16 deliver power to load 18 including the pulsed load current.

At step 64, the FPGA continuously senses the instantaneous pulsed load current by obtaining current samples via current sensor 34 and A/D 36.

Concurrently, at step 66 the FPGA continuously senses the voltage of the capacitor bank 18 via A/D 40.

At step 68, the FPGA dynamically calculates the mathematical average value of the pulsed load current by integrating current samples obtained from current sensor 34 via A/D 36. The FPGA also calculates the mathematical average value of the capacitor bank voltage via the voltage sensor and A/D 40. The FPGA dynamically calculates the product of the average value of load current and average value of capacitor bank voltage to determine the average power drawn by the load 18. The FPGA then divides the average value of the drawn power by the instantaneous voltage of the capacitor bank 16 to obtain the instantaneous capacitor bank charge current required to achieve the constant power. The FPGA samples the sensor data continuously to dynamically compute the instantaneous capacitor bank charge current required to achieve constant input power to DC/DC power converter 12.

At step 70, the DC/DC power converter 12 delivers a charge current to the capacitor bank 16 and load 18 such that the input current to the DC/DC converter 12 is constant, and thus the DC/DC converter 12 draws a constant power from the power source at input 14.

This disclosure is also suitable for use in an AC power system, wherein AC input power is provided to an AC/DC converter feeding the DC/DC power converter 12.

Modifications, additions, or omissions may be made to the systems, apparatuses, and methods described herein without departing from the scope of the invention. For instance, the present disclosure is suitable for all applications where drawing a constant input power is beneficial. The components of the systems and apparatuses may be integrated or separated. For instance, power converter and controller may be integrated into a single integrated circuit. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A power system comprising:
   a capacitor;
   a power converter configured to charge the capacitor with a charge current, the power converter and the capacitor configured to deliver a pulsed load current to a load at a load voltage;
   a current sensor disposed between the capacitor and the load, the current sensor configured to sense the pulsed load current and generate a sensed current signal;
   a first analog-to-digital converter configured to convert the sensed current signal to a digital current signal;
   a load voltage sensor disposed between the power converter and the capacitor, the load voltage sensor configured to sense the load voltage and generate a sensed load voltage signal;
   a second analog-to-digital converter configured to convert the sensed load voltage signal to an instantaneous value of the load voltage;
   a controller coupled to the power converter and comprising a digital signal processor, the controller configured to:
      receive the digital current signal and the instantaneous value of the load voltage from the analog-to-digital converters and determine the pulsed load current and the load voltage,
      determine an average value of the pulsed load current,
      determine an average value of the load voltage,
      determine an average power delivered to the load as a function of the average value of the pulsed load current and the average value of the load voltage,
      determine an instantaneous value of the charge current of the power converter by dividing the average power by the instantaneous value of the load voltage, and
      control the power converter as a function of the instantaneous value of the charge current such that the power converter draws a constant power from a power source while delivering the pulsed load current to the load;
   a voltage error amplifier configured to receive the sensed load voltage signal and a reference voltage and to generate a voltage error output;
   a current error amplifier configured to receive a sensed current of the power converter and to generate a current error output; and
   a summer configured to sum the voltage error output and the current error output and to output an analog control signal that is input to the power converter.

2. The power system as specified in claim 1, wherein the controller is configured to determine the average value of the pulsed load current by integrating current samples obtained from the current sensor.

3. The power system as specified in claim 1, wherein the controller is further configured to establish the charge current as the function of the instantaneous value of the charge current such that the power converter draws the constant power from the power source.

4. The power system as specified in claim 1, wherein the power converter comprises a direct current/direct current (DC/DC) converter.

5. The power system as specified in claim 1, wherein the capacitor comprises a capacitor bank.

6. The power system as specified in claim 1, wherein the current error amplifier is further configured to receive an output of a digital-to-analog converter.

7. The power system as specified in claim 6, wherein the digital-to-analog converter is configured to receive a current output signal from the controller.

8. A method of operating a power system comprising:
   using a power converter, charging a capacitor with a charge current, the power converter and the capacitor delivering a pulsed load current to a load at a load voltage;
   sensing, at a current sensor disposed between the capacitor and the load, the pulsed load current and generating a sensed current signal;
   converting, at a first analog-to-digital converter, the sensed current signal to a digital current signal;

sensing, at a load voltage sensor disposed between the power converter and the capacitor, the load voltage and generating a sensed load voltage signal;

converting, at a second analog-to-digital converter, the sensed load voltage signal to an instantaneous value of the load voltage;

using a controller comprising a digital signal processor:
receiving the digital current signal and the instantaneous value of the load voltage from the analog-to-digital converters and determining the pulsed load current and the load voltage,
determining an average value of the pulsed load current,
determining an average value of the load voltage,
determining an average power delivered to the load as a function of the average value of the pulsed load current and the average value of the load voltage,
determining an instantaneous value of the charge current of the power converter by dividing the average power by the instantaneous value of the load voltage, and
controlling the power converter as a function of the instantaneous value of the charge current such that the power converter draws a constant power from a power source while delivering the pulsed load current to the load;

receiving the sensed load voltage signal and a reference voltage at a voltage error amplifier;

generating a voltage error output at the voltage error amplifier;

receiving a sensed current of the power converter at a current error amplifier;

generating a current error output at the current error amplifier; and summing the voltage error output and the current error output and outputting an analog control signal that is input to the power converter.

9. The method as specified in claim 8, wherein the average value of the pulsed load current is determined by integrating current samples obtained from the current sensor.

10. The method as specified in claim 8, further comprising:
using the controller, establishing the charge current as the function of the instantaneous value of the charge current such that the power converter draws the constant power from the power source.

11. The method as specified in claim 8, wherein the power converter comprises a direct current/direct current (DC/DC) converter.

12. The method as specified in claim 8, wherein the capacitor comprises a capacitor bank.

13. The method as specified in claim 8, further comprising:
receiving an output of a digital-to-analog converter at the current error amplifier.

14. The method as specified in claim 13, further comprising:
receiving, at the digital-to-analog converter, a current output signal from the controller.

15. A device comprising:
a power converter configured to charge a capacitor with a charge current, the power converter and the capacitor configured to deliver a pulsed load current to a load at a load voltage;
a current sensor disposed between the capacitor and the load, the current sensor configured to sense the pulsed load current and generate a sensed current signal;
a first analog-to-digital converter configured to convert the sensed current signal to a digital current signal;
a load voltage sensor disposed between the power converter and the capacitor, the load voltage sensor configured to sense the load voltage and generate a sensed load voltage signal;
a second analog-to-digital converter configured to convert the sensed load voltage signal to an instantaneous value of the load voltage;
a controller coupled to the power converter and comprising a digital signal processor, the controller configured to:
receive the digital current signal and the instantaneous value of the load voltage from the analog-to-digital converters and determine the pulsed load current and the load voltage,
determine an average value of the pulsed load current,
determine an average value of the load voltage,
determine an average power delivered to the load as a function of the average value of the pulsed load current and the average value of the load voltage,
determine an instantaneous value of the charge current of the power converter by dividing the average power by the instantaneous value of the load voltage, and
control the power converter as a function of the instantaneous value of the charge current such that the power converter draws a constant power from a power source while delivering the pulsed load current to the load;
a voltage error amplifier configured to receive the sensed load voltage signal and a reference voltage and to generate a voltage error output;
a current error amplifier configured to receive a sensed current of the power converter and to generate a current error output; and
a summer configured to sum the voltage error output and the current error output and to output an analog control signal that is input to the power converter.

16. The device as specified in claim 15, wherein the controller is configured to determine the average value of the pulsed load current by integrating current samples obtained from the current sensor.

17. The device as specified in claim 15, wherein the controller is further configured to establish the charge current as the function of the instantaneous value of the charge current such that the power converter draws the constant power from the power source.

18. The device as specified in claim 15, wherein the power converter comprises a direct current/direct current (DC/DC) converter.

19. The device as specified in claim 15, wherein the current error amplifier is further configured to receive an output of a digital-to-analog converter.

20. The device as specified in claim 19, wherein the digital-to-analog converter is configured to receive a current output signal from the controller.

* * * * *